Feb. 19, 1957 — L. E. NORTON — 2,782,312
GAS RESONANCE FREQUENCY CONTROL
Filed June 30, 1953 — 2 Sheets-Sheet 1
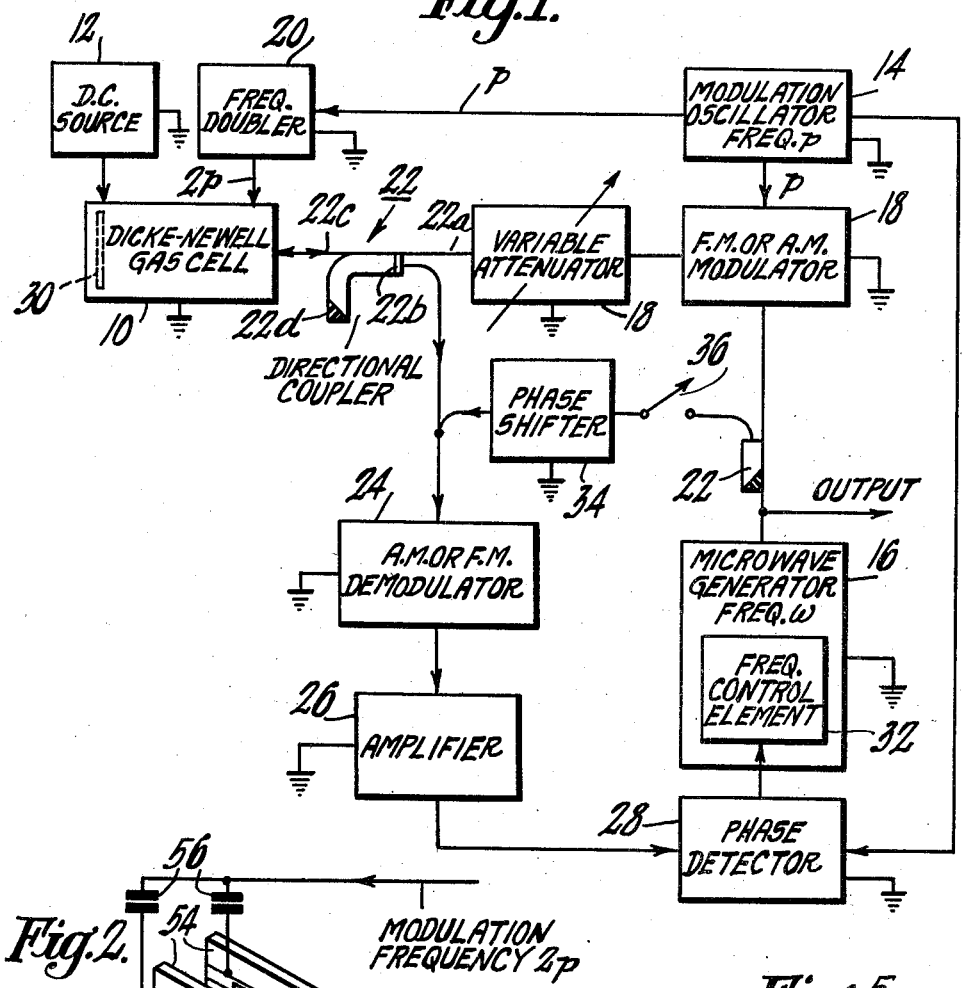
Fig. 1.
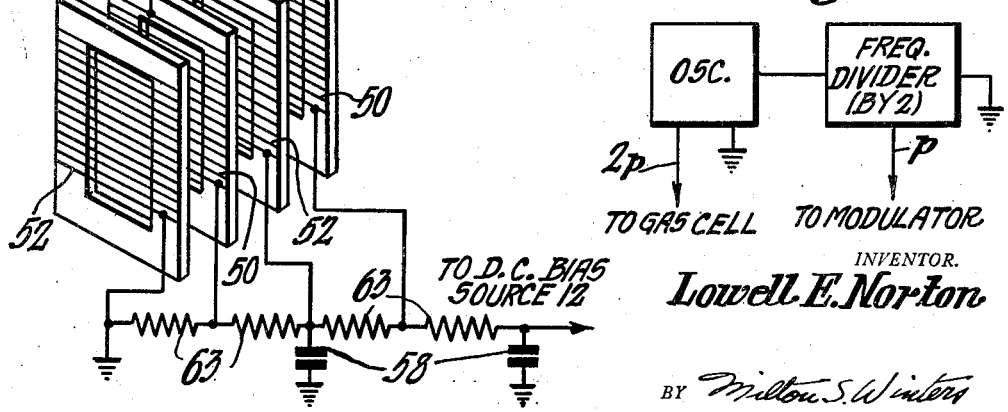
Fig. 2.
Fig. 5.
INVENTOR.
Lowell E. Norton
BY Milton S. Winters
ATTORNEY

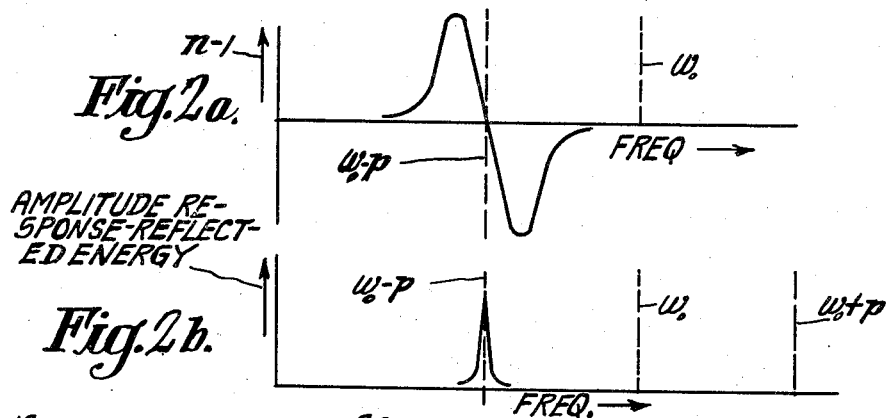
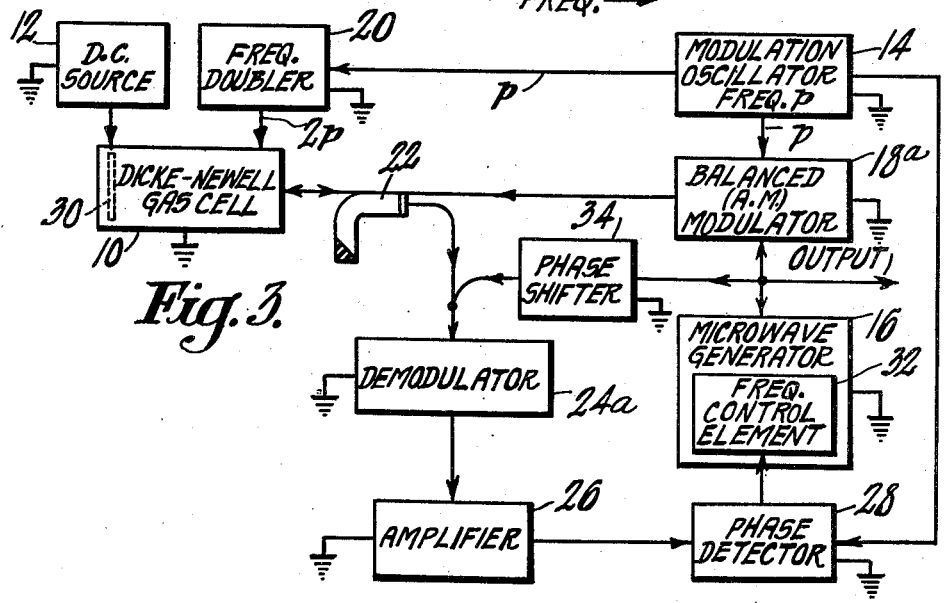
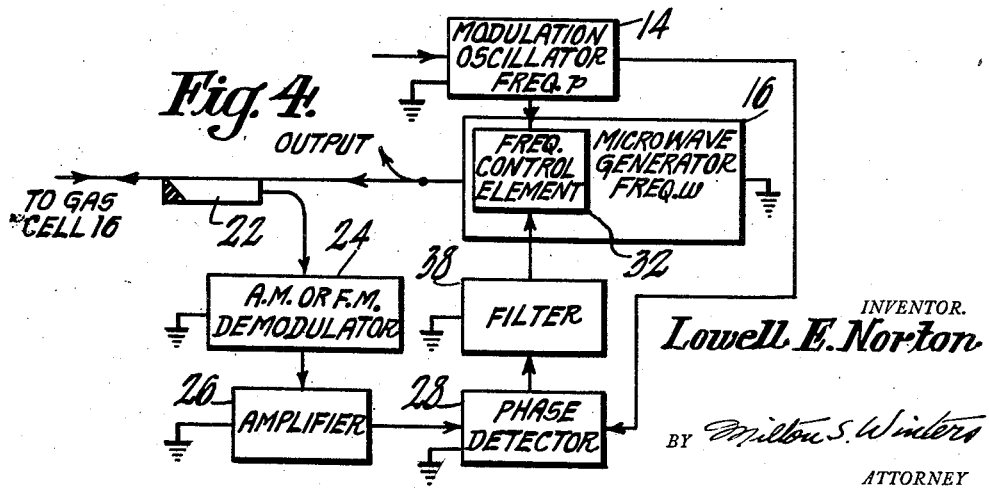

United States Patent Office 2,782,312
Patented Feb. 19, 1957

2,782,312

GAS RESONANCE FREQUENCY CONTROL

Lowell E. Norton, Princeton, N. J., assignor to Radio Corporation of America, a corporation of Delaware Application June 30, 1953, Serial No. 365,178

16 Claims. (Cl. 250—36)

The present invention is related to frequency control, and particularly to frequency control employing the phenomenon of gas resonance.

Various types of frequency control systems are known which employ conventional gas cells. An improved gas cell, which provides a spectral line narrower than previously known cells is disclosed in the copending application of Robert H. Dicke and George S. Newell, Jr., Serial No. 243,082, filed August 22, 1951, now Patent No. 2,749,443 granted June 5, 1956 entitled "Molecular Resonance System and Method." By using a gas cell like that disclosed in the said Dicke and Newell application, the Doppler breadth of the spectral line may be appreciably reduced. The reduction in line width in using a gas cell having a field periodic in both space and time, like the Dicke-Newell gas cell, may be employed to achieve a closer frequency control at the microwave frequencies involved, and a higher effective Q in the frequency control system, as known.

In a gas cell having a field periodic in time and space, when the energy or microwave field applied to the gas cell is at one frequency displaced from the undisturbed gas resonance frequency by half the modulating frequency of the field applied to the grids of the absorption cell, the reflected or re-radiated energy is coherent only for the other frequency displaced in reverse sense from undisturbed resonance by half the modulating frequency. The reflected or reradiated energy displays the characteristics of a spectral line, and also may be considered a pseudosideband.

It is an object of the present invention to provide a novel frequency control system of the type employing a gas cell having a field periodic in time and space.

Another object of the invention is to provide a frequency control system of the type employing a gas cell having a time and space periodic field with novel frequency control circuit especially adapted for use with such a gas cell.

A further object of the invention is to provide a frequency control system especially for using a gas cell of the spatial and time periodic field type in which changes or shifts in the frequency of the modulating field do not adversely affect the accuracy of control.

Another object of the invention is to improve frequency control by narrow spectural line gas cells of the type having a periodic space and time field.

A further object of the invention is to employ both pseudo-sidebands from a gas cell of the type described to advantage where heretofore only one pseudo-sideband at a time has been employed.

In accordance with the invention, oscillations from a microwave generator are modulated at an oscillation modulation frequency, and the modulated energy is applied to a gas cell of the type having a field periodic in time and space. The field modulation rate of the gas cell is synchronized at double the oscillation modulation rate, and the energy reflected or re-radiated from the gas cell is then demodulated. The demodulated component, as will appear more fully hereinafter, is phase sensitive in an exaggerated manner to frequency changes of the microwave generator. The demodulated energy is compared in phase to the oscillation modulation energy. Thus a voltage may be derived, sensitive to departures of the microwave generator from a predetermined frequency displaced by half the cell grid field modulation frequency (which displacement equals the oscillation modulation frequency) and having sense and amplitude corresponding to the departure. This voltage may be employed for microwave spectrographic or frequency control purposes.

The modulation of the microwave energy may be either AM (amplitude modulation) or FM (frequency modulation). If the modulation is FM, the demodulation is preferably AM; if the modulation is AM, the demodulation is preferably FM. By using the different kinds of modulation and demodulation in the same instance, the phase comparison output voltage is affected more by the phase shift of the reflected energy from the gas cell than would otherwise be the case. In some embodiments of the invention, microwave energy is modulated and reflection employed to supply a carrier for detection or demodulation. In others, balanced modulation is employed, and the carrier supplied directly from the microwave oscillator.

The foregoing and other objects, advantages, and novel features of the invention will be more fully apparent from the following description when read in connection with the accompanying drawing, in which like reference numerals refer to similar parts, and in which:

Fig. 1 is a diagram in block schematic form illustrating the invention;

Fig. 2 is a schematic perspective view of the internal construction of a gas cell having grids for providing a field periodic in time and space;

Figs. 2a and 2b are curves useful in understanding the operation of the gas cell of Fig. 2;

Fig. 3 is a diagram in block schematic form illustrating an embodiment of the invention employing balanced modulation;

Fig. 4 is a diagram in block schematic form illustrating a modification of Figs. 1 or 2; and Fig. 5 is a diagram in block schematic form illustrating another modification of Figs. 1 or 2.

Referring to Fig. 1, a gas cell 10 of the type disclosed in the said application of Dicke and Newell may have grids between which, if the gas in the cell is of the type having a quadratic Stark effect, a D. C. (direct current) field is preferably impressed by means of a D. C. source 12. A modulation oscillator 14 modulates energy from a microwave generator 16 by a modulation 18 of any type suitable to the microwave frequencies generated by the generator 16.

Frequency modulation may be accomplished by various known means, for example, as disclosed in Patent 2,479,859. Various means are also known for securing amplitude modulation. The modulation oscillator 14 is connected to a frequency doubler 20 as a means of providing field modulation oscillations of frequency $2p$ synchronized with the oscillations of frequency $p$ of the modulation oscillator. The doubler 20 output is applied to the gas cell 10 grids. A directional coupler 22 (which may be in the form of a magic T) has two pairs of arms 22a, 22b and 22c, 22d. Energy incident on the coupler in one arm is divided, if desired, equally, between the arms of the other pair, none being directly coupled to the other arm paired with the first one arm. The modulator 18 is connected to one arm 22a. One arm 22c of the other pair 22c, 22d serves to apply the energy to the gas cell 10. Arm 22d may be terminated in a matched absorptive termination as indicated. Energy reflected or re-radiated by gas in the cell 10 is fed by the directional coupler arm 22b to a demodulator or detector 24. The demodulated signal of frequency $p$ may be amplified by an amplifier 26 and then compared in phase with the signal of frequency p from the modulation oscillator 14, as in a phase detector 28. The phase detector output is applied to a frequency control element of the microwave generator 16, to correct frequency departure from its proper controlled frequency at the frequency $w_0$, at a spectral line of the gas.

The gas cell in operation has a field periodic in time and space, and such a gas cell is herein called a Dicke-Newell gas cell. One form of the gas cell internal structure is illustrated in Fig. 2. Its connection in the arrangement of Fig. 1 is also indicated in Fig. 2. Other forms of gas cell which may be employed are disclosed in the above-identified application of Robert H. Dicke and George S. Newell, Jr. Their manner of employment will be apparent from the present example. A series of planar grids, alternate ones indicated as 50 and 52, all with wires parallel to a predetermined direction (shown horizontal) are mounted on metallic frames 54. The grids are dielectrically spaced apart preferably at a quarter of the wavelength of the undisturbed gas molecular resonance frequency $w$. The modulation oscillation from the field modulation oscillator may be applied through blocking capacitors 56 to alternate grids 50. A D. C. field bias voltage, if required, may be applied by tapping off a series of voltage dividing resistors 63. The capacitors 58 by-pass any radio frequency (microwave) voltages on the other alternate grids 52. The grids are enclosed in an envelope (not shown) filled with the desired gas at reduced pressure, thus to be immersed in the gas. The microwave energy is applied to travel in a direction normal to the plane of the grids 50, 52 and polarized with the electric vector normal to the grid wires, to allow passage of the energy without serious obstruction by the grids, as shown in said Dicke and Newell application. Under these conditions, reflections or re-radiation takes place from the molecules of the gas. At either frequency, $w\pm p$ for the incident energy, the reflections are coherent or constructive. The phenomenon is due to the spatial periodic and time periodic field between the grids. The D. C. voltage or field between grids is used with some molecules, as $NH_3$, where the Stark shift is quadratic, by virtue of the cross product term produces a desired linear frequency shift due to a Stark field, where otherwise the shift would be quadratic with applied field. If the shift of the gas frequency employed is linear with applied field, as with some gases, then the D. C. field may be omitted.

The time and spatial periodic fields give rise to two travelling Stark waves, either one of which may be employed. One wave travels in the direction of the incident microwave energy, and the other in the reverse. Due to the shift in resonant frequency of the gas in adjacent "laminations" enclosed by adjacent grids, and to the quarter wave thickness of each lamination, constructive reflections are received only from a velocity class of molecules moving in the direction (or the reverse) of the incident wave. Therefore, when the incident microwave field is at frequency $(w+p)$ which is above the undisturbed gas resonance frequency $w$ by frequency $p$, molecules moving with the incident energy, due to Doppler shift, are resonated at $w$ referred to the moving molecules. The reflected energy, due to Doppler shift, is reflected and received at frequency $(w-p)$. The reflected line, like the gas resonance line, exhibits anomalous dispersion, as shown in Fig. 2a where $n$ is the index of refraction, and also a resonance line, as shown in Fig. 2b, only one resonance line being shown, namely that one occurring when the incident frequency passes through $(w+p)$, giving rise to the line shown at $(w-p)$. Another line at $(w-p)$ resulting when the incident energy is at $(w+p)$ is not shown. The term resonance line used in this sense is intended to be interpreted as the spectral distribution of energy in the coherent reflection.

For further details and a more complete explanation of the gas cell operation, reference may be made to the aforesaid copending application of Dicke and Newell.

In operation of the arrangement of Fig. 1, suppose the gas, preferably at low pressure, to have a resonance angular frequency at $w_0$. The modulator 18 may be an FM modulator and the modulation oscillator angular frequency may be $p$. Then the modulator output $e$ includes components:

$$e = E\left\{J_0\left(\frac{\Delta w}{p}\right)\cos wt \times J_1\left(\frac{\Delta w}{p}\right)\cos(w-p)t - J_1\left(\frac{\Delta w}{p}\right)\cos(w+p)t\right\}$$

neglecting higher order sidebands, which may be made negligible in amplitude by suitable choice of $\Delta w$, the frequency deviation at angular rate $p$ introduced by the modulator 18. $J_0$ and $J_1$ are the Bessel functions usually so indicated. Therefore, a signal at the lower sideband frequency $(w-p)$ is applied to the gas cell 10. The frequency doubler 20 causes a reflection line at $$(w-p)+2p$$

or $(w+p)$, assuming $w$ to be at or near the undisturbed resonant frequency of the gas. The reflected energy provides a signal J $$J_1 E\left(\frac{\Delta w}{p}\right)\cos[(w+p)t+\phi]$$

The phase angle $\phi$ depends on the refractive index $n$ and is critically frequency dependent. If $w$ is at the undisturbed gas resonance, $\phi$ is zero. Similarly, reflection due to incidence of the upper sideband applied to the gas cell provides a reflection signal of $$J_1 E\left(\frac{\Delta w}{p}\right)\cos[(w-p)t+\phi]$$

by coherent reflection. If the path length from the directional coupler 22 to the gas cell and return is suitably selected, as by a line adjuster or by adjusting the position of a reflecting metallic plate 30 indicated in Fig. 1 at the end of gas cell 10 remote from the end from which the incident energy approaches, the phase relation between the reflected carrier frequency and the reflected pseudo-sidebands is such that the voltage input to detector 24 may be represented as $e_1$, $$e_1 = E_1\left\{J_0\left(\frac{\Delta w}{p}\right)\cos wt + J_1\left(\frac{\Delta w}{p}\right)\cos[(w-p)t+\phi] - J_1\left(\frac{\Delta w}{p}\right)\cos[(w+p)t+\phi]\right\}$$

where $E_1$ is some amplitude factor.

The output of the AM detector, excluding higher frequency components, is then readily shown to have the form $$e_D = k_1 E_1 \sin \phi \sin pt$$

If $w$ is at the undisturbed gas resonance frequency, $\phi$ is zero. Now $\sin \phi$ is a highly sensitive function of the departure of $w$ from this resonance frequency, and changes sign with a change in the sense of the departure. Therefore, the detector output voltage $e_D$ is responsive in sense (or phase) and amplitude to the sense and amplitude of the frequency departure of $w$ from the undisturbed gas resonance frequency in a highly sensitive manner. The voltage $e_D$ is compared with the voltage of frequency $p$ in the phase comparison detector to derive a D. C. (direct current) control voltage also responsive in sense and amplitude to the departure of $w$ from the undisturbed resonance frequency. This control voltage may be zero with respect to the common ground, or it may have an arbitrary value for the condition of $w$ equal to the resonance frequency, departure from the arbitrary value in one sense or the other providing the sensing. This D. C. correction voltage may be fed back to the frequency control element 32 of the generator 16 to keep the frequency $w$ at the desired undisturbed gas resonance frequency. Or it may be used as a spectrographic indication of "on resonance," or calibrated for departures from resonance.

The microwave generator 16 may be a klystron, and its frequency control element may be a reflector; or the microwave generator 16 may be a magnetron with a frequency controlling grid for the control element 32. Other suitable generators are known. If the modulator 18 is an FM modulator, the demodulator 24 should be an AM demodulator, as indicated above. However, if an AM modulator is employed, it is readily shown that the desired sensing voltage is best secured by employing an FM demodulator 24. The reason for demodulating with a demodulator for the other type from that of the modulation may be qualitatively explained. If the same demodulation for the same type is employed, the demodulation provides a signal of frequency $p$ of large amplitude, which is not strongly responsive to the phase angle $\phi$. However, if one type of modulation is employed, and the other type of demodulation, the demodulated signal is of frequency $p$, but of amplitude zero, unless the phase angle $\phi$ is other than zero. Then, both in amplitude and sense, the demodulator output at frequency $p$ is greatly sensitive to the phase angle $\phi$. Suitable waveguide forms for the detector 24, which may include a crystal detector, are well known in the art.

In order to be certain of a strong reliably phased "carrier" signal of frequency $w$ at the demodulator 24, it is unnecessary to rely on reflections from the Dicke-Newell gas cell internal metallic structure or a plate 30 as shown. In general, in fact, such reflections should be minimized to avoid interference with the phase sensitive pseudo-sideband energy by reflections of the incident sideband energy from metal and the like. Such minimizing may be accomplished in known manner. Therefore, energy may be applied directly from microwave generator 16 either through another directional coupler 22, as shown, or by means of a Y connection, as of waveguide (not shown) at the output of the generator 16, by a path excluding the gas cell. For the purpose of illustration, the alternative is indicated by including a switch 36. However, if this form is used, no actual switch need be included, or it may be of suitable waveguide form. The phase shifter 34 permits proper adjustment of the phasing of the so-called supplied carrier signal desired for the requisite sensing. If direct feed from the output of microwave generator 16 is employed, then the reflector 30 may be omitted and replaced with a matched termination.

Referring to Fig. 3, the system illustrated is similar to that of Fig. 1, except that there is specifically indicated a balanced modulator 18a for modulator 18. Such a balanced modulator is preferred because of the carrier wave suppression. The supplied carrier wave therefore comes substantially entirely by feed directly from the output of microwave generator 16 through phase shifter 34 to the demodulator 24a. Demodulator 24a takes either of two forms. If the phase shift of the carrier over the path from 16 to 24a, including phase shifter 34 is made to be $$\frac{2a-1\pi}{2}$$

(where $a$ is any integer) from its original value, then 24a is an AM detector which could be a diode. If the phase shift over the same indicated path is made $a\pi$ then 24a is, as specifically indicated, of the FM type. A suitable form for the balanced AM modulator 18a is of the usual waveguide magic T type, as illustrated and described as a component in my copending application Serial No. 351,182, filed April 27, 1953. The FM demodulator 24a may be any of several types suitable for use at microwave frequencies. For example, it may be made up around a resonator and a single diode. The resonator frequency is adjusted so that the FM signal falls on one slope of its envelope. Alternatively, and preferably, the FM demodulator could be built up around two parallel branch paths and a diode. The difference in path lengths should be $\pi$ at the carrier frequency to give a zero resultant signal. The resultant composite signal received over the two paths is not zero as the carrier is FM modulated because the departure from phase balance is proportional to frequency deviation during modulation. The manner of connection of these components will be clear to those skilled in the art from the foregoing. The operation will be apparent from what is said above.

The modification of Fig. 4 illustrates a different means of securing a frequency modulation signal for application to the gas cell 10. The previous arrangements provide either a modulated signal with a stabilized carrier frequency or an unmodulated stabilized frequency depending on the point from which the output is taken. In the modification of Fig. 4, the carrier frequency is not separable, except by filtering (not shown). The output of the modulation oscillator 14 is applied to the frequency control element 32. The output of the phase detector is also applied to the frequency control element 32, but after passage through a filter 38. The filter 38 excludes frequencies which lie within the band of the frequency or frequencies $p$. For example, if the frequency $p$ is in the range of 100 to 5,000 cycles per second, the filter 38 may prevent passage of frequencies in this range, but may pass frequencies below 100 and above 5,000 cycles per second. It may be noted that in general, $p$ is preferably substantially greater than half the spectral line width. The filter 38 is employed to obviate reduction, possibly substantially to zero, of the frequency deviation by feedback. Thus the carrier frequency of the frequency modulated output may be stabilized, without adversely affecting the frequency modulation.

As indicated in Fig. 5 an oscillator of frequency $2p$ and a frequency divider (by 2) may be employed, respectively, in lieu of the frequency doubler 20 and the modulation oscillator 14. Any arrangement that synchronizes the oscillator modulation frequency at one-half the frequency applied to the gas cell as the gas cell modulation frequency is permissible.

It will be noted that according to the invention, simultaneous use is made of both of the pseudo-sidebands, that is, two reflected spectral lines, from the Dicke-Newell cell. In previous control systems employing this type of cell, only one reflection line is employed. Therefore, among the advantages of the system is the increase in the sideband power available for use in the detector detection, as it is this sideband power which carries the desired information of frequency departure from the desired carrier frequency. Another advantage, since $p$ need not be a fixed frequency, is that a highly stabilized carrier frequency may be suitably modulated in the microwave region; and the modulation components themselves are used in securing the frequency stabilization desired. In other systems generally suggested, the carrier frequency is separately stabilized.

What is claimed is:
1. A frequency control system comprising a gas cell of the type having means for providing a field periodically varying in space and in time, means for providing a first frequency signal and a second frequency signal synchronized with and double the frequency of the first frequency signal, means to apply said second frequency signal to said gas cell, a generator of a signal at an unmodulated resonance frequency of the gas of said cell, means to modulate the signal of said generator to derive a pair of sideband signals displaced equally in frequency from said generator signal frequency, means to apply said sideband signals to said gas cell to derive a pair of reflected sideband signals, the lower of the reflected signals being at the frequency of the higher of the said applied signal frequencies and vice versa, means to demodulate said reflected signals with a fixed phase signal from said generator as a supplied carrier to derive a demodulation signal, and means to compare the phase of said demodulated signal with said first frequency signal to derive a control voltage.

2. The system claimed in claim 1, said generator having a voltage responsive frequency control element, said control voltage being applied to said element.

3. The system claimed in claim 1, said means for providing said first and second frequency signals comprising an oscillator having as its operating frequency said first frequency and a frequency doubler to double said first frequency to provide said second frequency.

4. The system claimed in claim 1, said means for providing said first and second frequency signals comprising an oscillator having as its operating frequency said second frequency and a frequency divider to subdivide by two said second frequency to provide said first frequency.

5. The system claimed in claim 1, said means to modulate the signal of said generator comprising a modulator to which the generator signal and the first frequency signal are applied.

6. The system claimed in claim 5, said modulator being a balanced modulator for amplitude modulation.

7. The system claimed in claim 1, said means to modulate the signal of said generator comprising a modulator for frequency modulation to which the generator signal and the first frequency signal are applied.

8. The system claimed in claim 1, said generator having a voltage responsive frequency control element, said means to modulate the signal of said generator comprising means to apply said first frequency signal to said control element.

9. The system claimed in claim 8, further comprising a filter, and means to apply said control voltage through said filter to said frequency control element.

10. The system claimed in claim 1, said means to modulate said generator signal providing one of the two: amplitude modulation and frequency modulation, said means to demodulate comprising a demodulator for the other of said two modulations.

11. The system claimed in claim 1, said means to modulate said generator signal providing frequency modulation, said means to demodulate comprising a demodulator for amplitude modulation.

12. The system claimed in claim 1, said means to modulate said generator signal providing amplitude modulation, said means to demodulate comprising a demodulator for frequency modulation.

13. The system claimed in claim 1, said fixed phase signal being supplied from said generator by carrier energy reflected internally from said gas cell.

14. The system claimed in claim 13, said gas cell including a metallic reflector to reflect said carrier signal.

15. The system claimed in claim 1, further including a signal path excluding said gas cell for supplying said fixed phase generator signal from said generator to said means to demodulate.

16. The system claimed in claim 1, further including a signal path between said generator and said means to demodulate, for supplying said fixed phase generator signal and having at least a portion exclusively for said generator signal.

References Cited in the file of this patent

UNITED STATES PATENTS

| | | |
|---|---|---|
| 2,631,269 | Norton | Mar. 10, 1953 |
| 2,637,767 | Hershberger | May 5, 1953 |